United States Patent

[11] 3,558,086

[72] Inventor Stanley W. Kraly
      R.D. 1, Wexford, Pa. 15090
[21] Appl. No. 754,677
[22] Filed Aug. 22, 1968
[45] Patented Jan. 26, 1971

[54] FOOD AND BEVERAGE DISPENSER FOR PASSENGER AIRCRAFT
6 Claims, 4 Drawing Figs.

[52] U.S. Cl. .................................................. 244/118,
                                                         186/1; 16/96
[51] Int. Cl. ....................................................... B64d 11/04
[50] Field of Search ............................................ 294/118;
                                                         186/1; 16/91, 96

[56] References Cited
UNITED STATES PATENTS

| | | | |
|---|---|---|---|
| 3,102,607 | 9/1963 | Roberts | 186/1 |
| 3,169,574 | 2/1965 | Behlen | 16/91 |
| 3,179,208 | 4/1965 | Umanoff | 186/1 |
| 3,295,635 | 1/1967 | Cahn | 186/1 |
| 3,366,199 | 1/1968 | Cahn | 186/1 |
| 3,396,820 | 8/1968 | Kenny | 186/1 |

Primary Examiner—Milton Buchler
Assistant Examiner—Steven W. Weinrieb
Attorney—Stanley J. Price, Jr.

ABSTRACT: This disclosure relates to a method and apparatus for serving food and beverages in a passenger aircraft. Each luggage rack has a rail member extending longitudinally in the passenger compartment forming a pair of spaced parallel rails. A pair of dispenser supports have wheels mounted above and below one of the rails and laterally extending arm portions. A food and beverage dispenser has pairs of spaced wheels rotatably mounted on a rear vertical wall above and below the other rail. The dispenser has a pair of lateral tube members in which the arm portions of the supports are telescopically positioned to support the food and beverage dispenser for longitudinal movement along the rails in the passenger compartment. The food and beverage dispenser is preferably constructed so that it extends over the passenger seats so that the aisle between the seats remains unobstructed. The dispenser is positioned on the rails adjacent the galley and filled with trays of food. The dispenser is then moved along the rails to the opposite end of the passenger compartment and the trays of food are distributed to the passengers in the vicinity. The empty dispenser is then moved back to the vicinity of the galley and again refilled with trays of food. The refilled dispenser is again moved along the rails to a location where the trays are distributed. The dispenser can also be used to dispense beverages before, during or after the meal and may be used to collect the trays and beverage containers.

PATENTED JAN 26 1971        3,558,086

INVENTOR
STANLEY W. KRALY

BY Stanley J. Piech
his ATTORNEY

FOOD AND BEVERAGE DISPENSER FOR PASSENGER AIRCRAFT

BACKGROUND OF THE INVENTION

1. Field of the Invention

This invention relates to a method and apparatus for serving food and beverages in a passenger aircraft and more particularly to a method and apparatus for conveying the food and beverages from the galley to various locations in the passenger compartment by a rail mounted dispenser.

2. Description of the Prior Art

The conventional present day practice of serving food and beverages in a passenger aircraft is limited to the hostess carrying one or two trays of food from the galley to the passengers in the passenger compartment of the aircraft. Beverages are usually served in a similar manner. This present day method of serving food and beverages is both inefficient and time consuming.

To increase the speed at which the beverages and food are dispensed, mobile serving carts are used in some instances. The carts are positioned in the aisle and moved along the aisle as food and beverages are dispensed to the passengers. Although the mobile serving cart increases the speed at which the food and beverages are dispensed, the serving carts create a problem in that they block the aisle and prevent the passengers from moving from one portion of the compartment to the other. There is a need, therefore, for a method and apparatus for dispensing food and beverages in as short a period of time as possible.

SUMMARY OF THE INVENTION

The method and apparatus for serving food and beverages of this invention reduces substantially the time required to serve food and beverages in a passenger aircraft and permits the aisle between the rows of seats to remain unobstructed for passenger traffic while the food and beverages are being served. The food and beverage dispenser of this invention includes a rail mounted dispenser that may be positioned above the passenger seats and is movable longitudinally throughout the passenger compartment. The dispenser is filled with food trays or beverages adjacent the galley and moved on the rails to various locations in the passenger compartment. The dispenser and its support members may be quickly assembled and positioned on the rails and also quickly removed therefrom after use.

Accordingly, the principle object of this invention is to provide an improved method for dispensing food and beverages from an elevated rail mounted dispenser.

Another object of this invention is to provide a rail mounted food and beverage dispenser that may be utilized to serve food and beverages in the passenger compartment of an aircraft without obstructing the center aisle of the passenger compartment.

These and other objects and advantages of this invention will be more completely disclosed and described in the following specification, the accompanying drawings, and the appended claims.

DESCRIPTION OF THE PREFERRED EMBODIMENT

Figure 1:
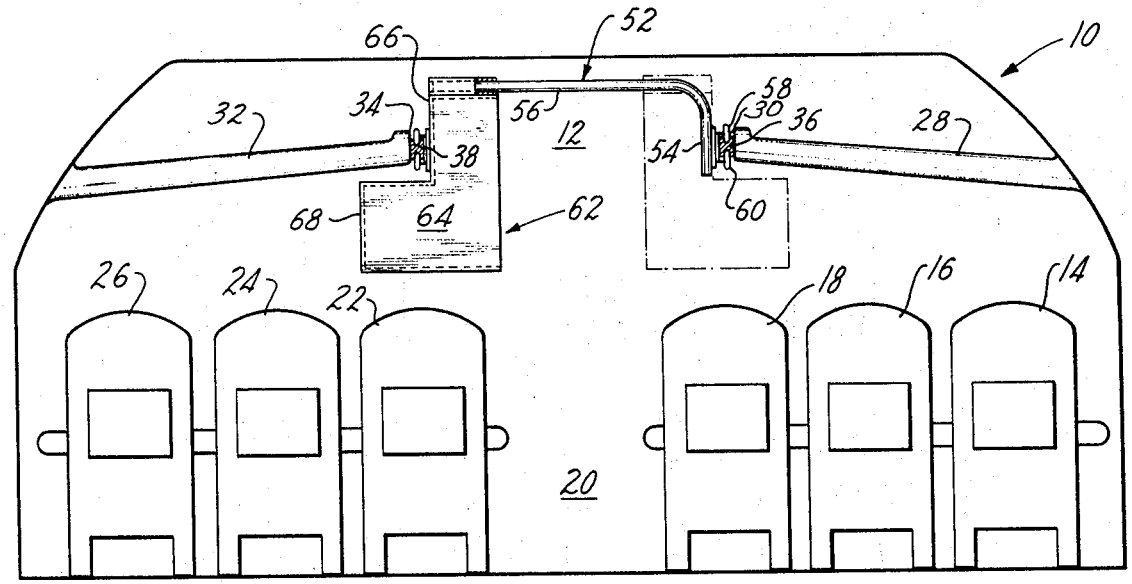
FIG. 1 is a sectional view in end elevation of an aircraft passenger compartment with the food and beverage dispenser mounted on rail members.
Figure 2:
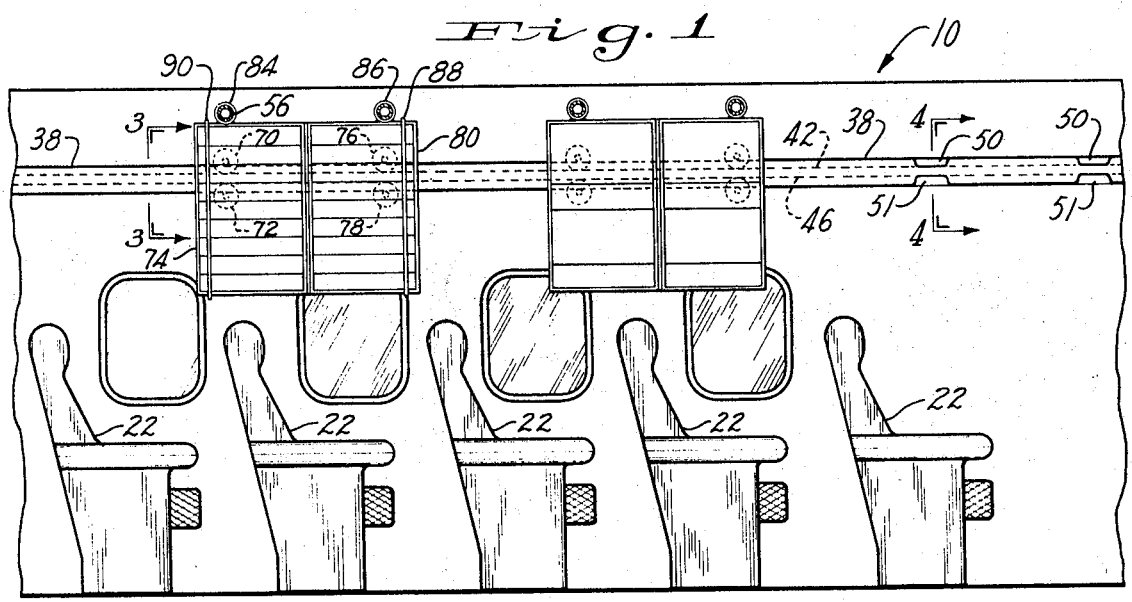
FIG. 2 is a view in side elevation illustrating one dispenser to distribute trays of food and a second dispenser arranged to serve beverages.

Referring to the drawings and particularly FIGS. 1 and 2, there is illustrated an aircraft generally designated by the numeral 10 with a passenger compartment 12. There are a plurality of rows of passenger seats 14, 16 and 18 on one side of a central aisle 20 and a plurality of longitudinally extending rows 22, 24 and 26 on opposite sides of the central aisle 20 within the passenger compartment 12. Above the rows of seats 14, 16 and 18 there is a laterally extending baggage rack 28 that terminates in a front edge portion 30. Similarly, there is a laterally extending baggage rack 32 above the rows of seats 22, 24 and 26 that terminates in an edge portion 34. The racks 28 and 32 are positioned adjacent the upper portion of the aircraft 10 to provide sufficient headroom for the passengers in the seats 14, 16, 18, 22, 24 and 26.

A rail member 36 is secured to the front edge 30 of rack 28 and extends longitudinally throughout the passenger compartment. Similarly, a rail 38 is secured to the front edge 34 of rack 32 and extends longitudinally throughout the passenger compartment so that there are a pair of parallel rails 36 and 38 positioned on the opposite sides of the aisle 20 that extend longitudinally throughout the passenger compartment 12.

Figure 3:
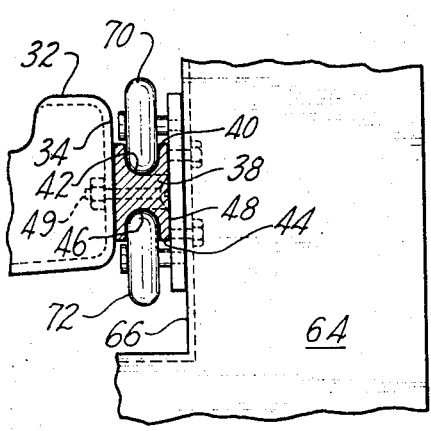
FIG. 3 is a fragmentary view in elevation taken along the lines 3-3 of FIG. 2 illustrating the rail configuration in section.
Figure 4:
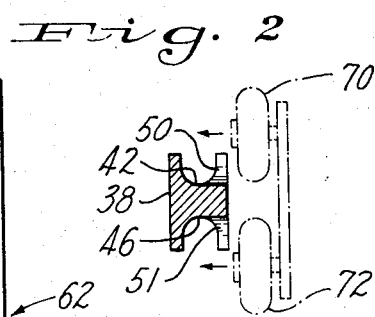
FIG. 4 is a fragmentary view in section taken along the line 4-4 in FIG. 2 illustrating the rail with openings therein for removal of the food and beverage dispenser from the rail member.

The rails 36 and 38 are of similar construction and rail 38 is illustrated in detail in FIGS. 3 and 4. The rail 38 has an upper longitudinal surface 40 with an upper concave rail surface 42 and a lower surface 44 with a lower concave rail surface 46. The concave rail surfaces 42 and 44 form a vertical end wall 48 on the rail 38. A plurality of openings 50 and 51 (FIGS. 2 and 4) are provided in the rails 38 and 36 to position the dispenser and support member, as later explained. The rails 36 and 38 are secured to the respective end walls 30 and 34 by means of bolts 49, or the like.

A pair of dispenser support members 52, one of which is illustrated in FIG. 1, each have a body portion 54 with an arm 56 extending laterally therefrom. A pair of wheel members 58 and 60 are rotatably secured to the body portion 54 and mounted in the concave rail surfaces 42 and 44 of rail 36. The wheel members 58 and 60 are inserted through suitable openings similar to openings 50 and 51 illustrated in FIG. 2 to position the wheels 58 and 60 on the inboard side of the rail end wall 48. A portable dispenser generally designated by the numeral 62 has an internal chamber 64 and an upper rear wall 66. The lower portion 68 of dispenser 62 extends laterally beyond the end wall 66 to provide additional chamber space within the dispenser 64. Wheels 70 and 72 are rotatably secured to the dispenser end wall 66 adjacent the sidewall 74 and are positioned in the concave rail recessed portions 42 and 44 as illustrated in FIG. 3. Another pair of wheels 76 and 78 (FIG. 2) are rotatably secured to the end wall 66 adjacent the sidewall 80. The wheels 76 and 78 are also positioned in the rail recessed portions 42 and 44. The dispenser top wall 82 has a pair of spaced tubular members 84 and 86 operable to telescopically receive the arms 56 of dispenser support members 52.

The dispenser 62 has suitable receiving means within the chamber 64, such as a collapsible tray rack to receive a plurality of trays of food therein. The dispenser 62 may also have a collapsible beverage or sundry rack therein to hold various beverages, glasses, cups, and the like. Vertical flexible rod members 88 and 90 are secured to the front portion of the dispenser to prevent tray spillage by sliding from the rack within the chamber during instability of the aircraft.

The dispenser 62 is mounted in flight on the rails in the following manner. The empty dispenser 62 is lifted up at a location where the openings 50 and 51 are in overlying relation with the wheels 70, 72, 76 and 80 (see FIG. 2) and the wheels are positioned on the concave rail surfaces 42 and 44. The dispenser support arm 56 is then telescopically positioned within the tubular member 84. The dispenser support 52 is then moved laterally until the wheels extend through similar openings 50 and 51 in rail 36 to secure the dispenser support 52 on rail 36. The arm 56 of a second dispenser support 52 is telescopically positioned in the tube 86 secured to the top wall 82 of dispenser 62 and the wheels 58 and 60 are inserted through the openings 50 and 51 to secure the other dispenser support member on the rail 36. Suitable locking means may be provided for the wheels on the dispenser 62 or on the dispenser support member 52 to fixedly position the dispenser 62 at the desired location within the passenger compartment 12.

The empty dispenser 62 is then moved along the rails 38 and 36 to a location adjacent the galley where food trays are positioned in the tray rack within the dispenser chamber 64. The dispenser 62 is then moved longitudinally along the rails 36 and 38 to a location remote from the galley and the locking means for the wheels is engaged to fixedly position the dispenser 62 within the passenger compartment 12. The hostess then removes the trays from the chamber 64 and serves the passengers at a location remote from the galley. After all of the trays have been removed from the dispenser 62, the dispenser is again moved along the rails 36 and 38 to a location adjacent the galley. The dispenser 62 is again filled with trays of food and moved along the rails to a location where the food is served to the passengers. Where desired, the same dispenser 62 may be utilized to distribute beverages to the passengers in a similar manner, or another dispenser may be used, one dispenser for beverages and the other dispenser for trays of food.

Although the passengers on both sides of aisle 20 can be served from the dispenser in the location illustrated in FIG. 1 with the previously described apparatus, it is possible to position the dispenser 62 on the opposite side of the aircraft, as is illustrated in phantom lines in FIG. 1. The dispenser can also be utilized to gather the trays and beverage containers and transport a substantial number of the trays and containers to the galley by the same method as is employed to serve the food to the passengers. It should be noted with the herein described apparatus for serving food and beverages in a passenger compartment of an aircraft, that the aisle 20 remains unobstructed during the serving of the food and beverages. It will be also apparent with the previously described arrangement that it is now possible to rapidly and efficiently dispense food and beverages within the passenger compartment of an aircraft and minimize spillage caused by the instability of the aircraft during serving.

According to the provisions of the patent statutes, the principal, preferred construction and mode of operation of this invention have been explained, and what is considered to represent its best embodiment has been illustrated and described. However, it should be understood that, within the scope of the appended claims, the invention may be practiced otherwise than as specifically illustrated and described.

I claim:

1. In an aircraft having a passenger compartment with a plurality of rows of seats on opposite sides of a longitudinally extending aisle the combination comprising:

a pair of parallel rails positioned on the opposite sides of said aisle and extending longitudinally in said passenger compartment;

a dispenser support having a body portion and a laterally extending arm portion;

first wheel means extending laterally from said body portion and mounted on one of said rails;

a food and beverage dispenser having a chamber with a rear wall;

second wheel means extending laterally from said rear wall and mounted on said other one of said rails;

said dispenser having a laterally extending receiver; and said dispenser support laterally extending arm positioned in said dispenser receiver to maintain said dispenser on said rail so that said dispenser is movable longitudinally in said passenger compartment to dispense food and beverages therefrom.

2. An aircraft having a passenger compartment with a plurality of rows of seats on opposite sides of a longitudinally extending aisle as set forth in claim 1 in which:

said passenger compartment includes a pair of laterally extending luggage racks above the rows of seats on opposite sides of said aisle; and said rails secured to an edge portion of said racks.

3. An aircraft having a passenger compartment with a plurality of rows of seats on opposite sides of a longitudinally extending aisle as set forth in claim 1 in which:

said second wheel means includes a first pair of wheels positioned above and below one of said rails and a second pair of wheels positioned above and below said last named rail; and said second pair of wheels spaced longitudinally from said first pair of wheels on said dispenser rear wall.

4. An aircraft having a passenger compartment with a plurality of rows of seats on opposite sides of a longitudinally extending aisle as set forth in claim 1 which includes a pair of dispenser supports spaced longitudinally from each other and positioned in receivers on said dispenser.

5. An aircraft having a passenger compartment with a plurality of rows of seats on opposite sides of a longitudinally extending aisle as set forth in claim 1 in which, each dispenser support includes a pair of wheels positioned above and below one of said rails.

6. An aircraft having a passenger compartment with a plurality of rows of seats on opposite sides of a longitudinally extending aisle in which:

a pair of rails extend along the compartment parallel to said aisle;

said rails include an upper surface with an upper concave rail surface and a lower surface with a lower concave rail surface and a vertical end wall; and said vertical end wall having openings therein for positioning upper and lower wheels on said respective rail surfaces.